United States Patent
Tischer et al.

(10) Patent No.: US 6,275,316 B1
(45) Date of Patent: *Aug. 14, 2001

(54) MONITORING AND/OR CONTROLLING DEVICE AND PROCESS

(75) Inventors: Friedrich-Christian Tischer, Backnang; Ernst-Ulrich Scheuing, Allmersbach i.T.; Ernst Kremers, Murrhardt; Roland Himmler, Aspach, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,255
(22) PCT Filed: Sep. 26, 1996
(86) PCT No.: PCT/DE96/01874
§ 371 Date: Apr. 7, 1998
§ 102(e) Date: Apr. 7, 1998
(87) PCT Pub. No.: WO97/15127
PCT Pub. Date: Apr. 24, 1997

(30) Foreign Application Priority Data

Oct. 18, 1995 (DE) .............................................. 195 38 755

(51) Int. Cl.[7] .................................................. H04B 10/02
(52) U.S. Cl. ......................... 359/177; 359/110; 359/179
(58) Field of Search .......................... 359/177, 123–124, 359/135, 136, 110, 173, 179

(56) References Cited

U.S. PATENT DOCUMENTS

| | | | |
|---|---|---|---|
| 5,383,046 | 1/1995 | Tomofuji et al. | 359/176 |
| 5,436,750 | * 7/1995 | Kawano | 359/177 |
| 5,625,481 | * 4/1997 | Tamura et al. | 359/177 |
| 5,805,322 | * 9/1998 | Tomofuji | 359/177 |
| 5,847,856 | * 12/1998 | Imai et al. | 359/177 |
| 6,075,633 | * 6/2000 | Deguchi et al. | 359/177 |

FOREIGN PATENT DOCUMENTS

| | | |
|---|---|---|
| 41 09 683 A1 | 9/1992 | (DE) . |
| 44 21 441 A1 | 4/1995 | (DE) . |
| 0 449 475 A2 | 10/1991 | (EP) . |
| 0 481 964 B1 | 5/1995 | (EP) . |
| 2 268 852 | 1/1994 | (GB) . |

OTHER PUBLICATIONS

"Optisches Wellenlaengenmultiplex . . . " by R. Himmler et al., Optische Nachrichtentechnik, Book Oct. 1995, pp. 10–19.

Patent Abstract of Japan, JP 5292037, Published Nov. 5, 1993.

* cited by examiner

Primary Examiner—Kinfe-Michael Negash
(74) Attorney, Agent, or Firm—Michael J. Striker

(57) ABSTRACT

The method of controlling and/or monitoring an optical transmission of message signals over an optical line in a repeater station includes providing a device (45) for generating further optical secondary signals from the received optical secondary signals without generating a stable optical carrier signal for the secondary signals in the device (45). This device (45) includes a hybrid circuit (451) for splitting the received optical secondary signals to form a first branched optical signal portion and a second branched optical signal portion, an optical monitoring and/or control receiver (454) for generating control and/or monitoring signals (456) from the first branched optical signal portion and an optical modulating device (458) controllable by the control and/or monitoring signals. In this method of controlling and/or monitoring the further optical secondary signals are produced from the second branched optical signal portion in the optical modulating device (458) under control of the control and/or monitoring signals (456) while maintaining an optical carrier frequency of the further optical secondary signals equal to that of the optical secondary signals received and the further optical secondary signals are interleaved by time-division or code-division multiplexing.

9 Claims, 3 Drawing Sheets

MONITORING AND/OR CONTROLLING DEVICE AND PROCESS

BACKGROUND OF THE INVENTION

The term "multichannel systems" is understood to mean communications systems for common transmission of a plurality of message signals via a common medium, utilizing common devices. As a rule, they are intended for long distances, for which they are especially attractive from both a technical and an economic standpoint. In these cases, depending on the nature of the signals transmitted, a greater or lesser number of intermediate regenerators or intermediate amplifiers (hereinafter referred to by the more general term repeater stations) is needed between the source and the sink of the message signals. Multichannel systems are known from electrical communications technology, in the form of frequency-division multiplexing or carrier frequency systems, and in optical communications they are known in the form of wavelength multiplexing systems.

It is usual in multichannel systems to attach signals of particular frequencies or wavelengths to message blocks (in electrical frequency-division multiplexing technology, these attached signals are often called a pilot tone or pilot frequency; in optical communications they are called a monitoring signal), and these signals take on various auxiliary tasks, such as that of representing the level state of the total band; in this case, the level of these signals is evaluated and used to regulate the level of the total bandwidth, and/or to ascertain the exceeding of certain impermissible level states, such as a drop in the level below a predetermined value. However, they can also be used as a carrier signal, for carrying monitoring information onward or for delivering control instructions to repeater stations. It will readily be appreciated that the two task areas can also be combined; in addition, still other special tasks (such as being utilized as a reference frequency signal) are also common. All of these monitoring or control signals will hereinafter be referred to as secondary signals, in which (temporarily, or on a long-term basis) only one message channel is provided.

SUMMARY OF THE INVENTION

It is an object of the present invention to provide an improved method and an improved device for monitoring and/or control of a transmission route for messages over optical wave guides.

This object, and others which will be made more apparent hereinafter, are attained in a method for controlling and/or monitoring a transmission route for message transmission over optical waveguides, wherein the transmission route includes at least one repeater station that receives optical secondary signals, serving as monitoring and/or control signals, within an optical transmission channel from a preceding or upstream portion of the transmission route in a transmission direction and generates further optical secondary signals to be transmitted over a portion of the transmission route following the at least one repeater station in the transmission direction within the optical transmission channel.

According to the invention, the further optical secondary signals to be transmitted over the portion of the transmission route following the at least one repeater station are formed by optical modulation of the received optical secondary signals in a device provided in the at least one repeater station.

According to the invention the monitoring and/or control device in a repeater station in the transmission route for message transmission over the optical waveguides comprises means for connection to a portion of the transmission route on an input side thereof for receiving optical secondary signals acting as monitoring and/or control signals, means for connection to a following portion of the transmission route on an output side thereof for transmitting further optical secondary signals acting as further monitoring and/or control signals, and an optical modulator including means for modulating the optical secondary signals received on the input side to form the further optical secondary signals for further transmission.

The invention makes it possible to implement a monitoring and/or control channel for optical multichannel systems with amplifying repeater stations in an especially simple, economical way. All the essential, usual and known tasks of such monitoring and/or control channels can be performed. By means of the invention, the generation of stable optical carrier signals (which is considerably more complicated and expensive than the corresponding generation of stable electrical carrier signals) in repeater stations can be dispensed with.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF AN EXEMPLARY EMBODIMENT

Figure 3:
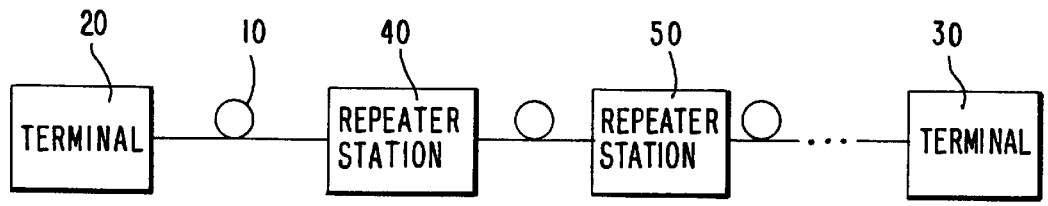
FIG. 3 is a block diagram of a multichannel system for optical transmission of messages in which the device of FIG. 1 is used.

FIG. 3 shows an optical line connection of a multichannel system with an optical waveguide 10 as the connection between a terminal device 20 and a terminal device 30 (counterpart terminal point), with repeater stations 40 and 50 disposed between them; in practice, the connection is typically bidirectional, while here only one transmission direction is shown. The number of repeater stations is merely an arbitrary example.

Figure 4:
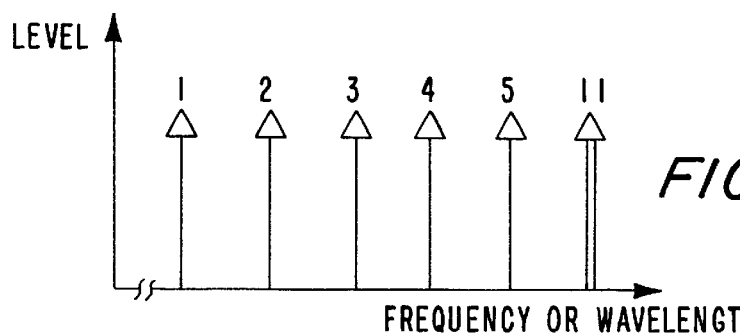
FIG. 4 is a frequency or wavelength diagram of an example of a multichannel system including five message channels and one monitoring and/or control channel.

FIG. 4 shows a frequency or wavelength diagram of such a system, with six monitoring channels, with five message channels 1–5 for useful signals and one monitoring and/or control channel 11, which is especially emphasized. The number of monitoring channels is merely an arbitrary example, and the same is true for the relative location of the monitoring and/or control channel 11 with regard to the message channels.

Figure 5:
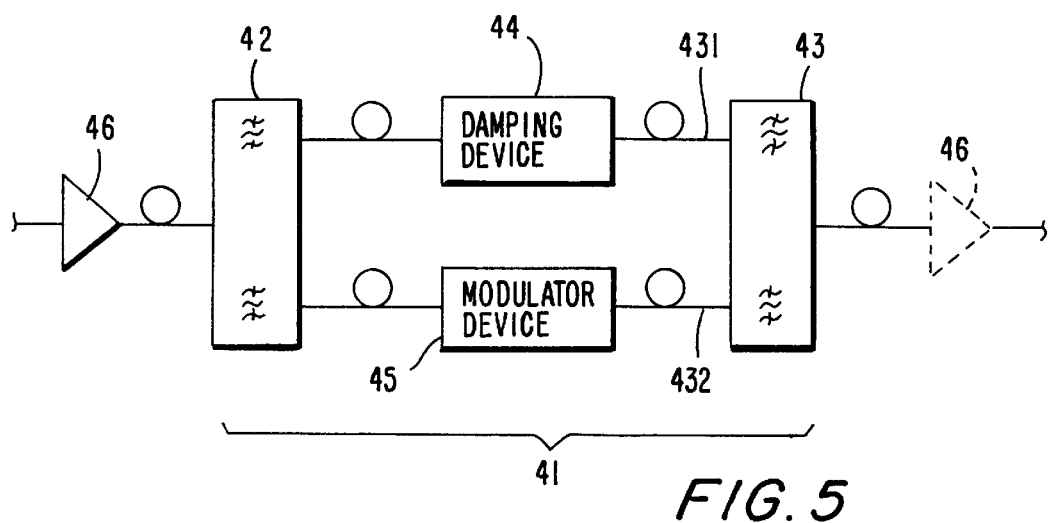
FIG. 5 is a block diagram of a processing device including the device of FIG. 1.

FIG. 5 shows a device 41 for separate frequency- or wavelength-selective processing of certain monitoring channels of the total bandwidth (channel blocks) of FIG. 4, comprising an input filter combination 42, an output filter combination 43, and separate, intervening devices, namely a device 44 for the main transmission band, comprising the message channels 1–5, on the one hand and another device 45 for the monitoring and control channel 11 on the other.

The frequency range of FIG. 4 is formed in the terminal device 20 (FIG. 3) and is transmitted to the counterpart terminal point via the repeater stations 40 and 50. In the monitoring and control channel 11, a permanently applied optical carrier signal with an amplitude equal to or systematically less than the amplitudes in the optical message channels 1–5 is preferably transmitted as the secondary signal. In FIG. 5, one processing device 41 is provided in each of the repeater stations. Devices 44 for the message channels 1–5 are each connected to inputs 431 of output filter combinations 43 and can have either optical damping elements for level adaptation of the various routes or more-complex devices, such as distortion suppression circuits to compensate for frequency or phase drifting, dispersion, or the like. They will not be discussed in further detail here; what is important is only that their damping is adapted to the damping of the route via a device 45 for the monitoring and/or control channel. Otherwise, essentially to compensate for the line damping of the line segment preceding them, the repeater stations 40 and 50 include optical amplifiers 46 (shown in dashed lines in FIG. 5) in the form of optical-fiber amplifiers, which are inserted either upstream or downstream of the processing device 41, or in split fashion both upstream and downstream of it, in the transmission route and are capable of transmitting signals over the total bandwidth of FIG. 4, including the monitoring and/or control channel 11.

Figure 1:
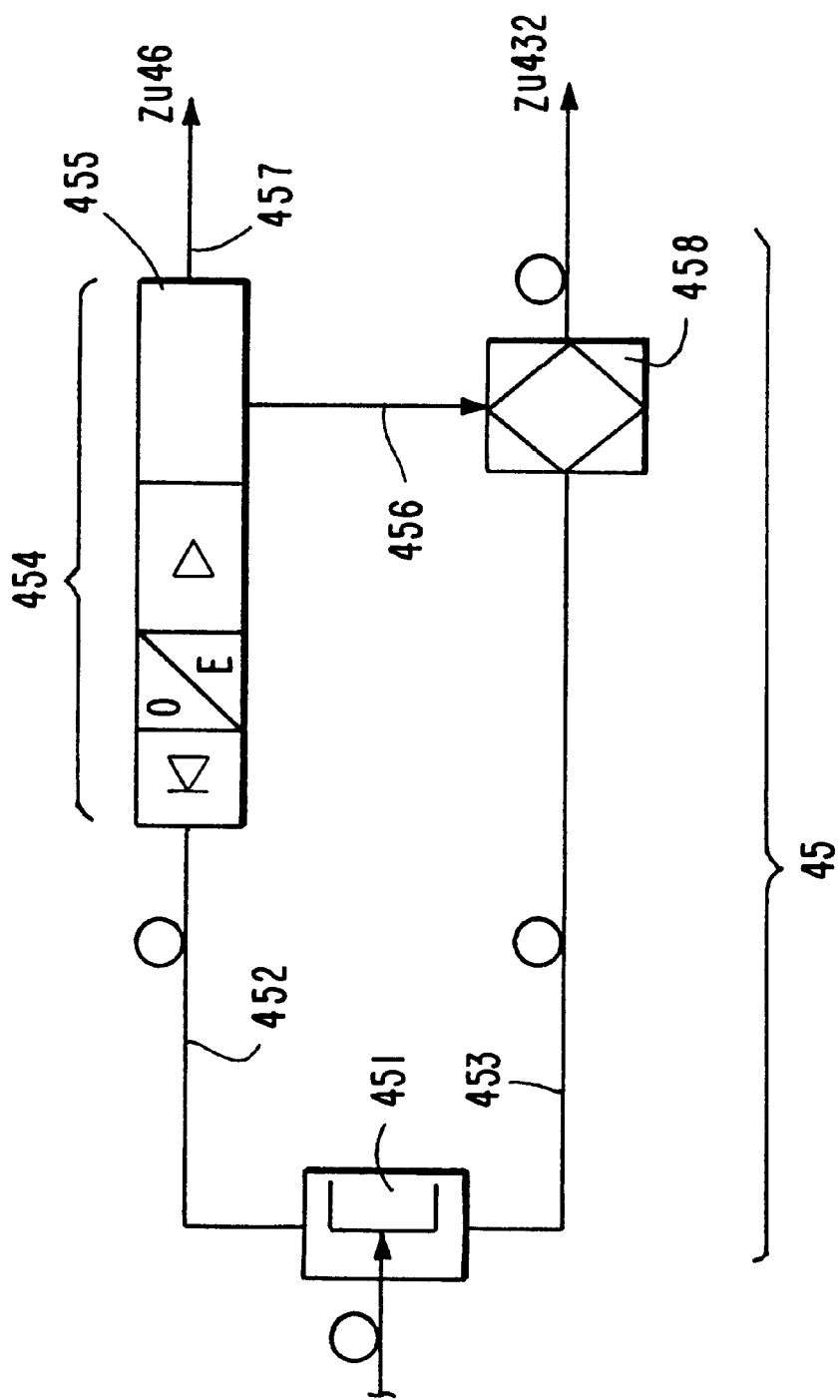
FIG. 1 is a block diagram of a device used for performing the method for controlling and/or monitoring a transmission route for message transmission over optical waveguides.

The devices 45 perform various subsidiary tasks. FIG. 1 illustrates the principle. First, there is a first hybrid circuit 451, which splits the secondary signal of the monitoring and control channel into two paths 452 and 453. An optical monitoring and control receiver 454 is connected to the path 452 and in a known manner it converts the secondary signal into an electrical signal, amplifies it, and evaluates it in an evaluation circuit 455. The evaluation can include the most various kinds of typical subsidiary tasks, such as monitoring for impermissible level deviations, or deriving a control signal 457 for closed-loop control of the gain of the amplifier 454, or both. The monitoring and control receiver 454 may also, in a known manner, output an electrical or optical signal as a reference frequency, for example to other devices in more-complex repeater stations that have additional tasks (such as adding or dropping partial blocks). From the applicable repeater station, the evaluation circuit 455 can be supplied with signals which are needed for comparison purposes and/or are carried onward over a line 456 (for instance in the form of a multiplex data stream, including with auxiliary carriers).

From the secondary signal, the partial signal on path 453 is fed back into the output filter combination 43 (input 432) via a further processing device 458. According to the invention, the processing device 458 comprises a device for modulating optical signals. This device may be either a passive, damping modulator, for instance in the form of an absorption modulator or a Mach-Zehnder interferometer, or a suitably modulatable active, amplifying modulator, for example in the form of an optical semiconductor amplifier or an optical-fiber amplifier. In addition to intensity modulation, other types of modulation are also possible. By means of this arrangement, the need for especially generating a highly stable optical carrier in the repeater stations is averted.

The mode of operation of the processing device 458 is such that with the signals on the lines 453 and 456, an optical multiplexing signal (time-division multiplexing, frequency-division multiplexing or other type of multiplexing signal) is generated for the input 432, specifically while keeping the carrier frequency present on the line 453 of the monitoring and control channel 11 unchanged.

Figure 2:
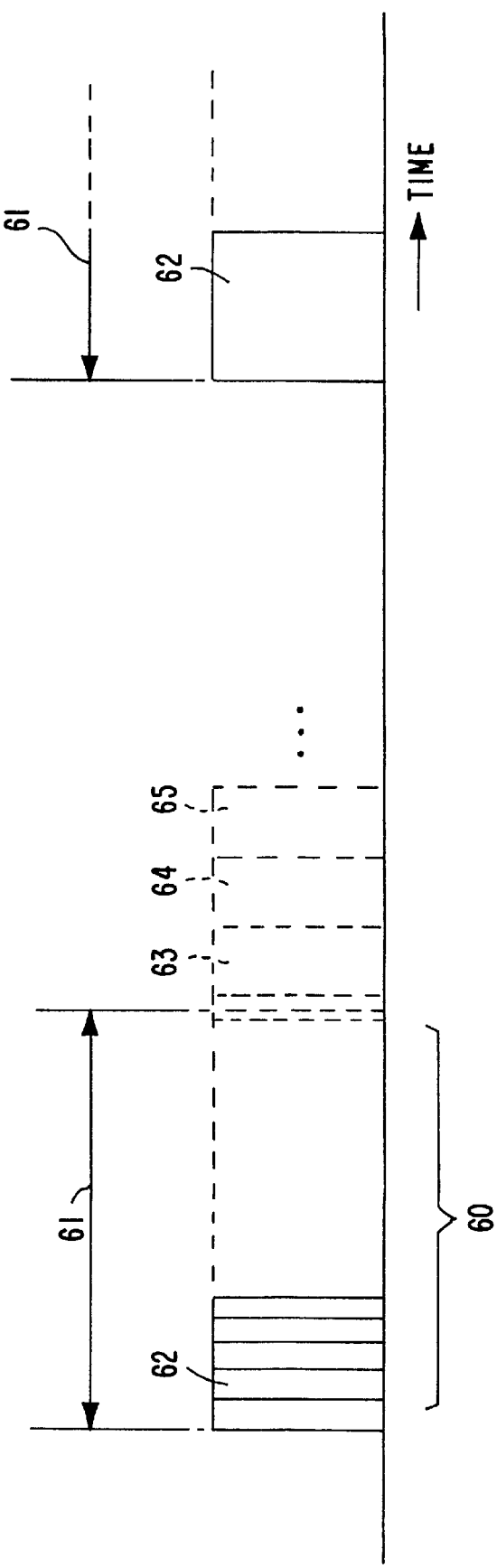
FIG. 2 is a time-division multiplexing diagram for the device shown in FIG. 1.

If the filtered-out secondary signal has already been modulated, and this modulation is to be retained, then the modulator must also be synchronized. The carrier signal, modulated for the first time or additionally modulated in this way, is then carried via further repeater stations (of which only repeater station 50 is shown here) to the distant counterpart end point 30, where it is evaluated. To enable separate evaluation of the monitoring and control signals of different repeater stations, a suitable multiplexing and especially time-division multiplexing plan can be used; by way of example, this can be embodied as in FIG. 2, in such a form that each repeater station, in the order in which the repeater station is placed in the transmission route, attaches a new signal packet 63, 64, 65, etc. to an existing secondary signal packet 60 (of duration 61) that is transmitted by the terminal device 20 and has a header signal 62 that is repeated at certain regular intervals. Methods for doing so are known and can easily be implemented electronically. The corresponding evaluation circuits are then part of the respective evaluation arrangement 455. In principle, an arbitrary number of further repeater stations can be included; each repeater station is equipped not only with the amplifiers 46 but also with the described devices 41 (FIG. 5).

In short, the mode of operation of a preferred exemplary embodiment of the invention can be summarized as follows, in conjunction with FIG. 1:

In a fiber-optical communications system, to make it easy to carry control and/or monitoring signals as secondary signals in a control and/or monitoring channel, in intermediate regenerators and/or intermediate amplifiers of a transmission route the secondary signals are filtered out of the total bandwidth and in a device 45, while keeping the optical carrier frequency unchanged, are optically modulated in a modulator 458 by means of further secondary signals (which can optionally be combined into a multiplex signal) that are carried over a line 456. The outcome of this signal processing is returned to the transmission route again at the output of the intermediate regenerator or intermediate amplifier.

What is claimed is:

1. A method of controlling and/or monitoring an optical transmission of message signals over an optical line, said optical line comprising at least one optical repeater station (40, 50) connected between optical wave guides (10), said method comprising the steps of:
   a) transmitting the message signals and optical secondary signals acting as monitoring and/or control signals over said optical line;
   b) receiving the optical secondary signals in said at least one optical repeater station (40, 50) from an upstream portion of said optical line;
   c) optically modulating said optical secondary signals received in step b) in said at least one optical repeater station (40, 50) to produce further optical secondary signals to be transmitted over a downstream portion of said optical line; and
   d) transmitting said further optical secondary signals over said downstream portion of said optical line;
   wherein no optical carrier signals are generated in said at least one repeater station (40, 50).

2. The method as defined in claim 1, wherein the optical modulating of step c) is performed passively.

3. The method as defined in claim 1, wherein the optical modulating of step c) is performed actively.

4. The method as defined in claim 1, wherein the optical modulating of step c) is performed actively by switching.

5. A method of controlling and/or monitoring an optical transmission of message signals over an optical line, said optical line comprising at least one optical repeater station (40, 50) connected between optical wave guides (10), said method comprising the steps of:
   a) transmitting the message signals and optical secondary signals acting as monitoring and/or control signals over said optical line;
   b) providing said at least one optical repeater station (40, 50) with a device (45) for generating further optical secondary signals to be transmitted from said at least one repeater station from said optical secondary signals received in said at least one optical repeater station, said device (45) comprising a hybrid circuit (451) for splitting the received optical secondary signals, an optical monitoring and/or control receiver (454) for providing control and/or monitoring signals (456) and an optical modulating device (458) controllable by the control and/or monitoring signals;
   c) splitting the optical secondary signals received in the at least one repeater station (40,50) by means of the hybrid circuit (451) to form a first branched optical signal portion and a second branched optical signal portion;
   d) providing the control and/or monitoring signals (456) by the optical monitoring and/or control receiver (454) receiving the first branched optical signal portion; and
   e) producing the further optical secondary signals from the second branched optical signal portion in the optical modulating device (458) under control of the control and/or monitoring signals (456) in the at least one repeater station so as to keep an optical carrier frequency of said further optical secondary signals to be transmitted equal to that of the optical secondary signals received in the at least one repeater station (40, 50) and so that the further optical secondary signals are interleaved by time-division or code-division multiplexing;
   wherein no optical carrier signals are generated in said at least one of said optical repeater station (40, 50).

6. A monitoring and/or control device in an optical repeater station for monitoring and/or control of transmission of message signals over an optical line, said monitoring and/or control device including
   means for receiving optical secondary signals together with the message signals in the optical repeater station;
   means (45) for generating further optical secondary signals to be transmitted from the optical repeater station (40,50) from the optical secondary signals received in the optical repeater station (40,50), said means (45) comprising a hybrid circuit (451) for splitting the received optical secondary signals to form a first branched optical signal portion and a second branched optical signal portion, an optical monitoring and/or control receiver (454) for generating control and/or monitoring signals (456) from the first branched optical signal portion and an optical modulating device (458) controllable by the control and/or monitoring signals (456);
   means for producing the further optical secondary signals from the second branched optical signal portion in the optical modulating device (458) under control of the control and/or monitoring signals (456), so that an optical carrier frequency of said further optical secondary signals transmitted over the optical line is equal to that of the optical secondary signals received in the at least one repeater station (40, 50) and so that the further optical secondary signals are interleaved by time-division or code-division multiplexing;
   wherein no optical carrier signals are generated in said at least one of said optical repeater station (40, 50).

7. The device as defined in claim 6, wherein said control and/or monitoring signals (456) produced by said optical monitoring and/or control receiver (454) are optical.

8. The device as defined in claim 6, wherein said control and/or monitoring signals (456) produced by said optical monitoring and/or control receiver (454) are electrical.

9. The device as defined in claim 8, wherein said optical monitoring and/or control receiver (454) comprises means for converting an input optical signal into an electrical signal and means for amplifying the electrical signal.

* * * * *